United States Patent
Tarcici

[15] 3,643,648
[45] Feb. 22, 1972

[54] SOLAR HEATING DEVICES

[72] Inventor: Adnan S. Tarcici, Avenue de Bude 13, 1200 Geneva, Switzerland

[22] Filed: Aug. 21, 1970

[21] Appl. No.: 65,938

[52] U.S. Cl. .......................................................... 126/270
[51] Int. Cl. ........................................................... F24j 3/02
[58] Field of Search ......................................... 126/270, 271

[56] References Cited

UNITED STATES PATENTS

| | | | |
|---|---|---|---|
| 2,586,583 | 2/1952 | Wagner | 126/270 UX |
| 2,760,482 | 8/1956 | Tarcici | 126/270 |
| 2,770,229 | 11/1956 | Tarcici | 126/270 |
| 2,806,134 | 9/1957 | Tarcici | 126/270 X |
| 2,998,002 | 8/1961 | Standig | 126/270 X |

Primary Examiner—Charles J. Myhre
Attorney—Robert E. Burns and Emmanuel J. Lobato

[57] ABSTRACT

A solar heating apparatus comprises a post, a collapsible tripod for holding the post perpendicular to a supporting surface and a frame universally mounted on the post. A pair of reflectors are mounted on the frame, each reflector comprising a plurality of sector-shaped segments pivotally joined at one end and alternate segments being interconnected by a flexible tape so that they can be collapsed in a superposed storage position and expanded with a fanlike movement to form a semiparabolic reflector. Means on the frame enable adjustment of the focal points of the reflectors. A second post is fixed, pivotally or otherwise, to the first post to enable an object to be held in the vicinity of the focal points of the reflectors. The frame can form a case for storage of the device.

13 Claims, 5 Drawing Figures

3,643,648

SOLAR HEATING DEVICES

BACKGROUND OF THE INVENTION

The present invention relates to solar heating apparatus adapted to concentrate the rays of the sun within a given area so as to heat an article located in this area.

Such apparatus are already known from my prior U.S. Pat. Nos. 2,760,482, 2,770,229 and 2,770,230. In practice, these known apparatus have been found to function satisfactorily, but nevertheless effective heating can only be obtained when the sun is favorably positioned.

Additionally, for apparatus provided with collapsible reflectors of the type disclosed in U.S. Pat. No. 2,806,134 it has been found necessary to reduce the number of reflector segments to a minimum in order to obtain satisfactory opening and closing of the segments with a fanlike movement. When the segments of the known devices are fully expanded they form a parabolic reflector having a fixed optical center, and this fixed optical center leads to the above-mentioned drawback whereby use of the apparatus is limited.

AIMS OF THE INVENTION

It is an object of the invention to provide an improved solar heating apparatus including a collapsible reflector in which the optical center of the reflector can be adjusted, which enables effective use of the heater during longer periods than with the heretofore known apparatus.

Another object is to join the segments of the reflector in a simple manner which enables the reflector to be composed of a relatively large number of segments which can be smoothly opened and closed in a fanlike movement and which enables adjustability of the optical center of the reflector to be enhanced.

A further object is to provide a solar heating apparatus comprising a pair of collapsible reflectors which can each be folded away to a nested position and opened with a fanlike movement to form a semiparabolic reflector, the optical centers of each of the semiparabolic reflectors being independently adjustable. This adjustment can be obtained in various manners: by displacing the center of pivoting of the segments; by raising or lowering one or both of the outermost segments in relation to a support therefor; by changing the degree of extension of the segments; or by combination of one or more of these means.

A subsidiary object is to ensure that the solar heating apparatus is completely collapsible so that it can be conveniently packed away for storage or transport without dismantling.

SUMMARY OF THE INVENTION

According to the main aspect of the invention, a solar heating apparatus comprises a support, a frame universally mounted on the support, a pair of reflectors mounted on the frame, each reflector comprising a plurality of segments pivotally joined at one end and interconnected by flexible means so that they can be expanded to form a semiparabolic reflector or collapsed to a superposed storage position, means on the support to enable an object to be heated to be held in the vicinity of the focal points of the reflectors when expanded, and means on the frame to enable adjustment of the focal points of the reflectors when expanded.

DESIGNATION OF THE DRAWINGS

DESCRIPTION OF PREFERRED EMBODIMENTS

The illustrated solar heating device comprises a pair of collapsible semiparabolical reflectors 1.

Figure 1:
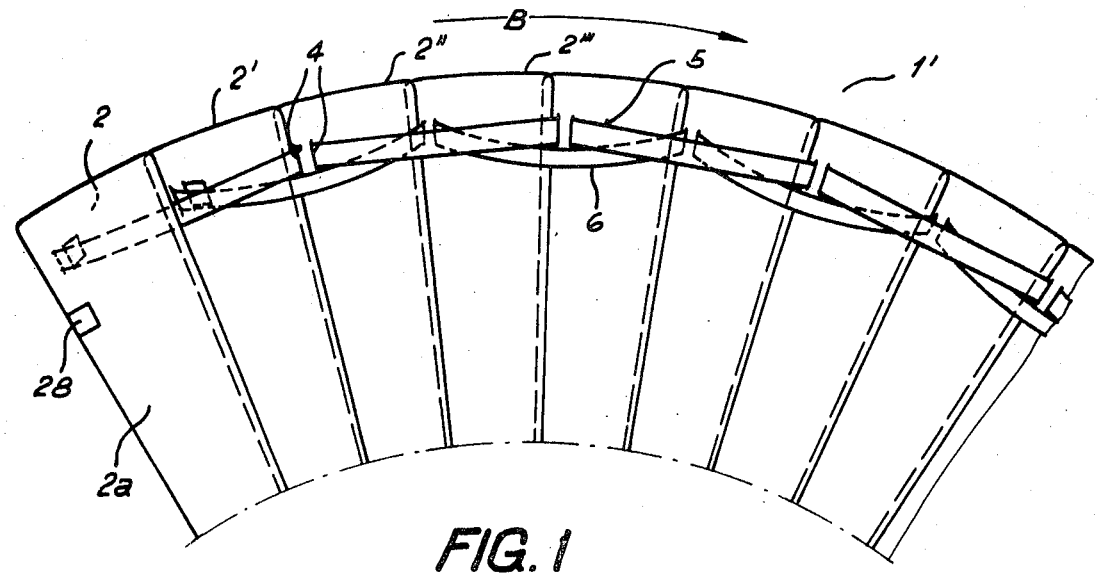
FIG. 1 is a rear view of part of a collapsible reflector for incorporation into a solar heating apparatus according to the invention, shown in the expanded position.
Figure 2:
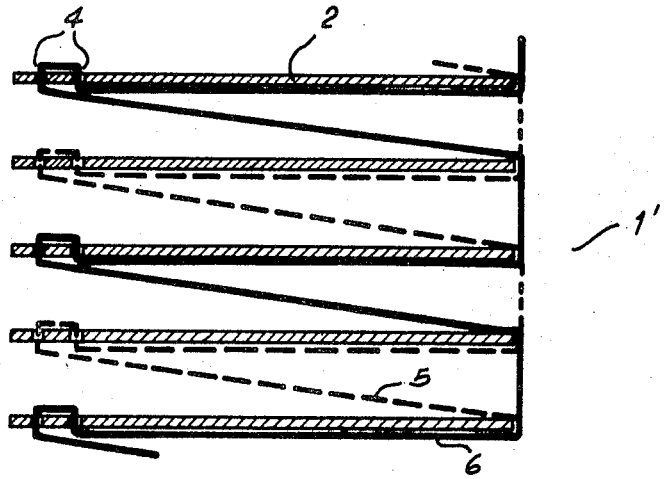
FIG. 2 is a schematic end view of a plurality of sectors of the reflector of FIG. 1 in the collapsed position.

Each reflector 1 comprises of a plurality of similar sector-shaped segments 2, 2′, 2″, 2‴ and so on, pivoted at one end about a pin 3. At their outer ends, the segments each have a pair of parallel slots 4 through which alternating segments are interconnected by means of tapes 5 and 6 in strong textile material. FIG. 1 shows the disposition of these tapes with the segments in the expanded position forming a reflector 1; FIG. 2 schematically shows the disposition of the tapes with the segments in the collapsed position, indicated generally by 1′, this figure being on an enlarged scale and the separation of the segments being greatly exaggerated for the sake of clarity. In FIG. 2 the tape 5 is represented by a dashed line, while the tape 6 is shown by a full line.

Each segment 2, 2′, 2″ consists of a thin, flexible blade of aluminum highly polished on the outer side (i.e., the upper side as shown in FIG. 2) to form a reflecting surface. Alternatively the segments could be provided in a plastic material coated on one side to form a reflecting surface. To ensure a sufficient rigidity for the reflector when the segments are opened, the first segment 2 is reinforced by a segment 2a of similar shape and material to segment 2 and joined thereto by rivets (not shown). This reinforcement is not absolutely essential, but is greatly preferable since the segments can then be made thinner and therefore more flexible, which leads to a reduction in cost and an improvement in adjustability.

From the collapsed position of FIG. 2, by pulling on the lowermost segment 2 in the direction of arrow A, the segments smoothly open out in fanlike manner. As soon as one segment moves, it pulls along the adjacent and the next but one segment; the segments do not therefore open one at a time, but all of the segments gradually and practically simultaneously open out. The length of tapes 5 and 6 is calculated so that when the segments are fully expanded, the tape is slightly tensioned to form a semiparabolical reflector. In the fully expanded position, as can be seen from FIG. 1, adjacent segments slightly overlap by a small amount determined by the spacing L (of a slot 4) from the edge of the segment (see FIG. 2).

In general, when the solar heating device is in use, the end segment 2 is in a raised position so that to collapse the segments it is sufficient to unlock the end segment 2 and the reflector smoothly folds away to the collapsed position 1′, it being simply necessary to lightly hold and guide the end segment 2 to avoid twisting. Again, because of the described system for connecting the segments, folding away can also be achieved gradually and not segment by segment.

Expanding and collapsing the described reflector takes place without any noticeable detrimental scratching of the reflecting surface. Furthermore a relatively large number of segments, for example 18 or 24, can be used to form a semiparabolical reflector having a radius of the order of 60 cm. This means that not only can the reflectors be conveniently stored, but the focus of the expanded reflectors can be easily adjusted.

Figure 4:
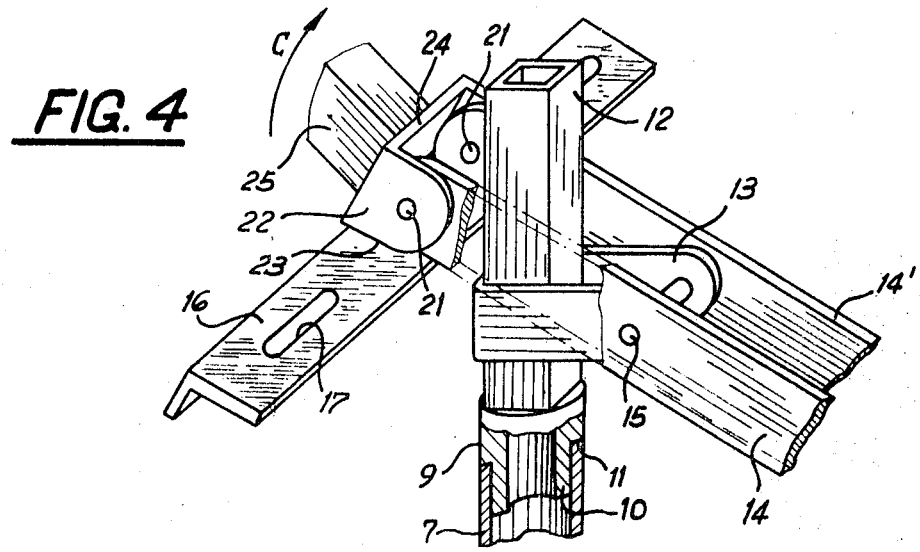
FIG. 4 is an enlarged scale perspective view, partly cut away and partly in cross section, showing the principal articulations of the device of FIG. 3.
Figure 3:
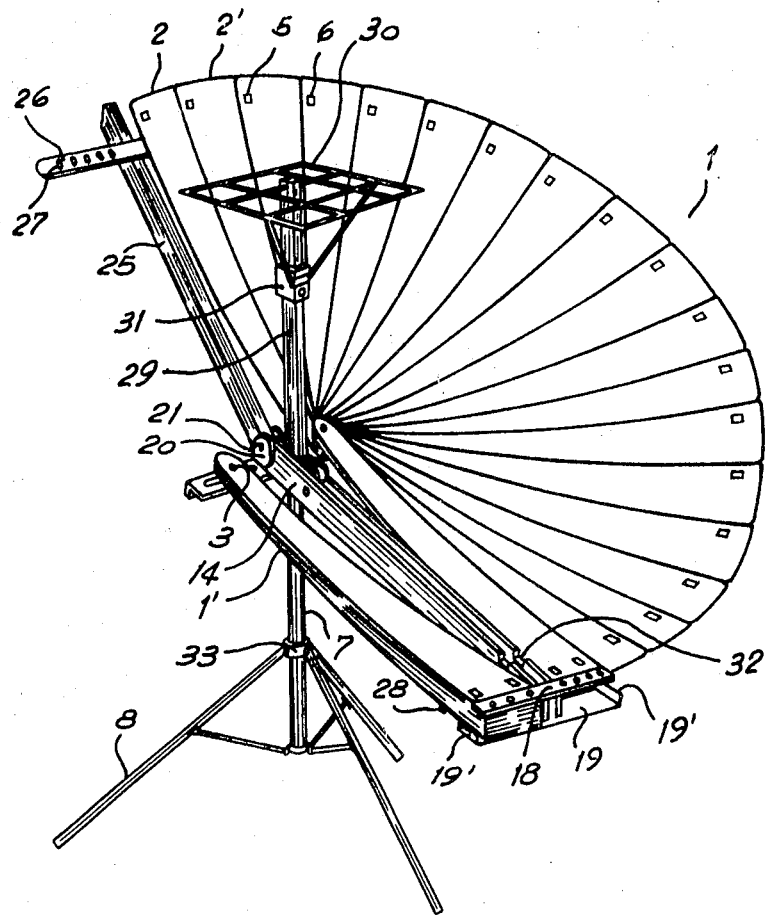
FIG. 3 is a perspective view of a first embodiment of the invention shown mounted for use, with only one half of the reflector expanded and the other half of the reflector collapsed.

Referring to FIGS. 3 and 4, the solar heating device comprises a hollow tubular post 7 which can be erected on a supporting surface by means of a collapsible tripod 8. In the upper end of the post 7 is rotatably mounted a joint member 9 having a bottom cylindrical part 10 and a shoulder 11. An upper part 12 of the joint member 9 is of substantially square cross section and a U-shaped piece 13 is clamped about the upper part 12.

A frame comprising a pair of arms 14, 14' is pivotally mounted on the U-shaped piece 13 by means of a schematically shown bolt 15. Washers (not shown) are provided so that the bolt 15 can be tightened to ensure a firm grip of the U-shaped piece on the joint member 9, while allowing the frame to be pivoted about the bolt 15 with a moderate amount of frictional resistance. At the end of arms 14, 14' adjacent the post 7, the frame includes an L-shaped crossmember 16 welded onto the arms and having slots 17 transversal to the arms. The arms 14, 14' are joined at their other end by a pair of bars 18 and 19.

The reflectors are mounted to the frame by their pins 3 which are bolted in the slots 17 in a manner so that they can be fixed at a desired lateral separation from the frame. The uppermost reflector segment is riveted to the upper bar 18 and, when the reflectors are in the collapsed position 1', the lowermost segment rests on the lower bar 19, as shown on the left-hand side of FIG. 3. To hold the reflectors in place in the closed position, the lower bar 19 can have lips 19', but this is not essential.

The frame additionally comprises a part 20 pivotally mounted to the other end of arms 14 and 14' by means of pins 21. The part 20 comprises a pair of sideplates 22 each having a flat bearing edge 23 and being joined by a plate 24. A rod 25 is welded on the plate 24 so that when the edges 23 bear against the crossmember 16, the rod 25 is inclined in relation to the arms 14 and 14', as shown in FIGS. 3 and 4.

Near the upper end of the rod 15 is a crosspiece 26 having a plurality of apertures 27 regularly spaced on either side of the rod. The lowermost sector 2 of the reflectors has a hook 28 on the surface of the double segment 2a. When the reflectors are opened out to the expanded position 1, the hook 28 can be inserted in one of the apertures 27 to hold the reflector in position.

To complete the solar heating device, a hollow post 29 of square cross section is fitted onto the square upper part 12 of the joint member 9. A gridlike plate 30 is pivotally supported at the top of post 29 and can be adjusted to a horizontal position by means of a sleeve 31 slidable along the post 29 and fixable by means of a clamping screw.

When both of the reflectors are mounted in the expanded position, the rays of the sun can be focused onto an object, such as a frying pan, placed on the plate 30 to heat the object and its contents. In order to obtain a satisfactory heating effect, the angle of the frame (and hence the reflectors) in relation to the posts 7 and 29 can be adjusted simply by pivoting the frame about bolt 15. As previously mentioned, a sufficient frictional resistance is provided in this joint so that the frame will remain in any desired angular inclination without slipping. Similarly, the reflector can be turned around to face the sun by pivoting of the joint member 9 in post 7; once again this joint is provided with a sufficient frictional resistance so that any desired angular position can be held.

In addition, the focal points of the two semiparabolical reflectors can be individually adjusted so as to obtain an optimum heating effect under given solar conditions. A first adjustment is achieved by selecting the aperture 27 into which the hook 28 is placed. When fixed by the aperture nearest the rod 25, the reflector has a pronounced curvature while when fixed by the outermost aperture, the sectors slightly approach one another and the reflector adopts a shallower curvature.

A second adjustment is achieved by adjusting the position of the pin 3 in the slots 17; by moving the pin outwardly the curvature is increased, while moving the pin inwardly decreases the curvature. A third adjustment can, desired be added. This could consist in mounting the upper bar 18 onto the arms 14, 14' on a slide member (not shown) fitting between the arms so that the position of bar 18 in relation to the arms 14, 14' can be adjusted by raising or lowering.

As a variant, it is possible to pivotally mount the post 29 onto the frame, for example about bolt 15. The post can then be tilted, keeping the plate 30 horizontal by moving the sleeve 31, to keep an object on the plate 30 at the focal center of the reflectors. Such a variant would be particularly useful when the sun is relatively low in the sky. However, under normal conditions the rigidly mounted post is found to be sufficient and any necessary adjustment can be achieved by displacing the object on the plate 30.

Another possible variant is that the rod 25, instead of being pivotally mounted to the frame, could be removably mounted by means of a bolt or otherwise. The rod 25 could also be made angularly adjustable in relation to the frame so as to enable a further adjustment for focusing the reflectors.

In addition to the above-described features of adjustability, the described solar heating device can conveniently be packed away for storage or transportation. The post 29 is firstly removed from the joint member 9 and the plate 30 is folded flat against the post 29 for convenient handling. The reflectors are next folded away to the collapsed position 1'. Rod 25 can then be pivoted in the direction of arrow C (FIG. 4) to lay flush against the arms 14, 14'. A pair of grooves 32 are provided in the upper edge of arms 14, 14' to accommodate the crosspiece 27 when the arm 25 is thus folded away. Next, the legs of the tripod 8 are folded away by sliding sleeve 33 along the post 7 and the post is folded flat against the arms 14, 14', one of the legs of the tripod fitting in the gap between these arms. The two parts of the solar heating device can then be strapped together or placed into a storage case.

The folded away device is extremely compact and can be conveniently handled and transported; preferably the main components such as the arms 14, 14', posts 7 and 29, rod 25 and so on are provided in a light but strong aluminum alloy for the sake of lightness and easy handling.

In the variant in which the post 29 is pivotally mounted to the frame, it is of course possible to erect and collapse the device without any need for mounting and dismantling separate parts. Such a variant is illustrated in FIG. 5, but with the additional refinement that the frame for supporting the reflectors forms a case into which the solar heating device can be packed away for storage and transport.

Figure 5:
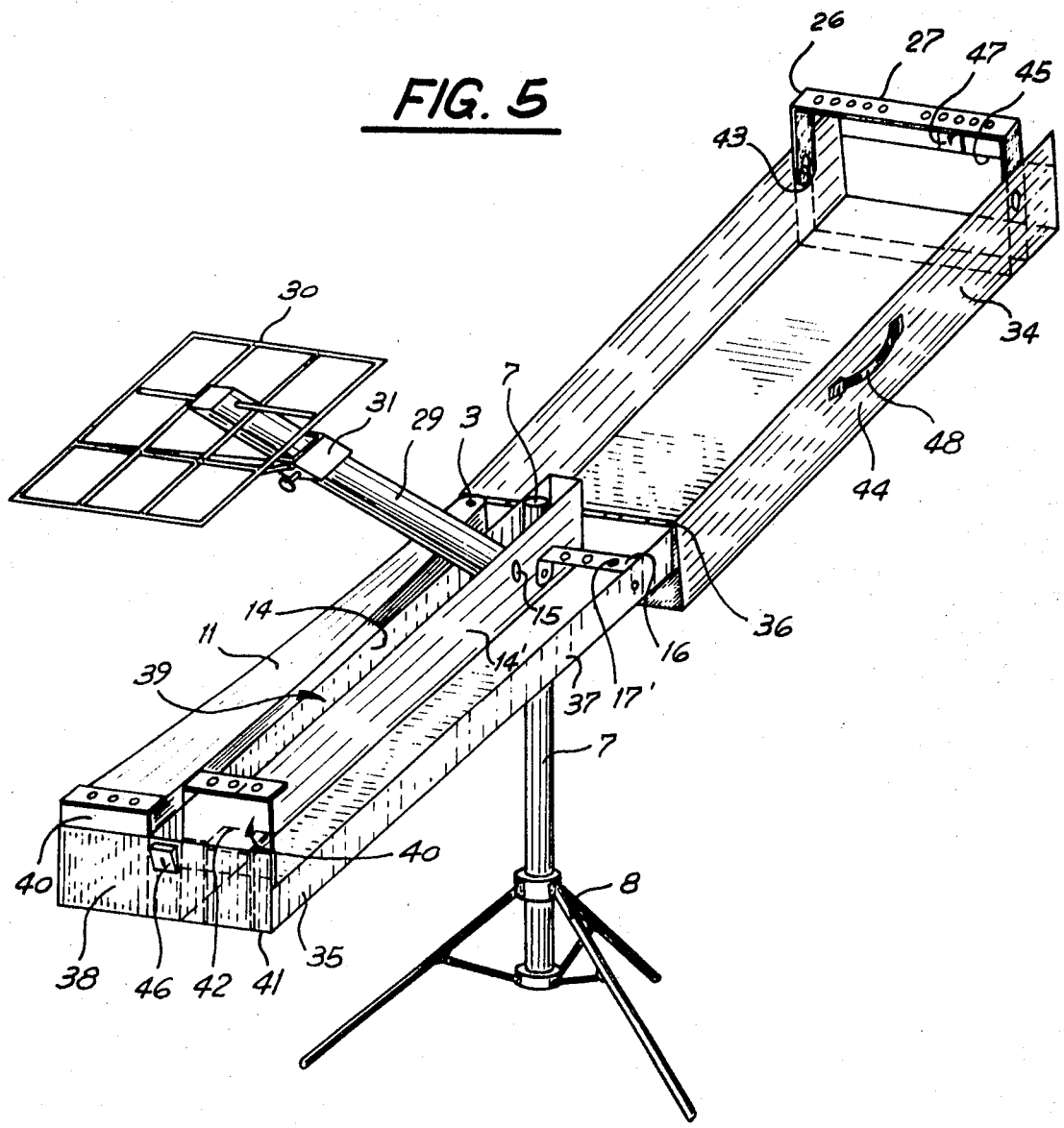
FIG. 5 is a schematic perspective view of a second embodiment of the invention during erection thereof for use, one of the reflectors being removed for the sake of clarity.

For the sake of convenience the same reference numerals have been used in FIG. 5 to designate parts which are the same as, or equivalent to, parts of the first embodiment.

In the second embodiment of solar heating device, the frame for supporting a pair of collapsible semiparabolic reflectors of the previously described type consists of a case comprising a top part 34, and a bottom part 35 pivotally mounted together about a hinge 36. The bottom part 35 has sidewalls 37 extending around three sides thereof, including the side by which it is hinged to the top part 35, a raised end wall 38 and a pair of raised central walls 14, 14' defining a central gap 39 therebetween; these walls perform a similar function to the arms 14, 14' of the first embodiment. A pair of crosspieces 16 having holes 17' are fixed between the walls 14, 14' and a pair of sidewalls 37. The pin 3 of the reflectors is bolted into one or another of holes 17', preferably using a wingnut so that the position of the pin 3 can be easily changed.

The outer end of the uppermost segment is rivetted to a supporting piece 40 which slidably engages grooves 41 in the inner side of the end wall 38. A small platform 42 on piece 40 supports the lowermost segment, when it is in the collapsed position. In order to expand the reflector from the collapsed position, the piece 40 is pulled out so that the lowermost segment clears the wall 37, and the lowermost segment is then pulled out drawing the other segments with it. When this solar heating device is in use, the height of piece 40 can be adjusted to obtain a suitable focusing of the reflectors; the piece 40 remains fixed in any chosen position due to the weight of the reflector wedging it in the grooves 41 and no other locking means is found to be necessary.

The top part 34 has a crosspiece 26 provided with apertures 27 pivotally mounted thereon about axes 43 and which can be moved to a raised position (as shown in full lines) to receive the hooks 28 (not shown) or a lowered position (indicated in dashed lines) for storage.

The top part 34 has three sidewalls 44, including the side by which it is hinged to the bottom part 35, having the same width as the end wall 38 of the bottom, and an end wall 45 having the same width as the sidewalls 37 of the bottom part. The top and bottom parts can thus either be closed together to form a case, cooperating locking means 46, 47 being provided on the end walls 38 and 45 to enable the case to be locked, or opened out, as shown, to form a reflector-supporting frame.

The frame can be supported on a post 7 by means of a collapsible tripod 8. The frame is universally mounted on this post in a similar manner to the first embodiment, or by any other suitable universal joint means. A post 29 supporting an adjustable gridlike plate 30 is pivotally mounted between the walls 14, 14' by a bolt 15 which can conveniently form part of the universal joint means or alternatively be separate from the universal joint. In the stored position, the post 29 fits in the upper part of the central gap 39 between the walls 14, 14' and the plate 30 is folded flat against the upper surface of the collapsed reflectors 1' in such a manner that the case can be closed. The tripod 8 and post 7 can then be folded away into the lower part of the central gap 39. If desired, the central gap can be divided into upper and lower compartments for respectively receiving the post 29 and the post 7/tripod 8.

A carrying handle 48 is provided on the case so that the solar heating device, when folded into the case, can be easily handled. As before, the principal components of the device are provided in a light aluminum alloy for the sake of lightness and consequent ease of handling.

When the second embodiment of the solar heating device is mounted ready for use, the following adjustments can be made to obtain optimum performance:

I. adjustment of the angular inclination and orientation of the frame by turning about the universal joint;

II. adjusting the angular inclination of the post 29, and hence the position of plate 30, in relation to the reflector; and III. adjusting the focal points of the two semiparabolical reflectors by choice of the apertures 17' for the pin 3 of the reflectors, by raising or lowering pieces 40, and by choice of the hooking apertures 27.

The described adjustments for focusing the reflectors have been found in practice to be a most important factor contributing to the performance of the solar heating devices. In particular, it has been found that the described devices can be usefully employed in less favorable solar conditions than with the previously known devices, and can be used for a longer period during the day. The previous devices were, in practice, only effective under the most favorable conditions at about midday with the sun at its zenith whereas with the described devices the reflectors can easily be focused to adapt to the position of the sun and the strength of the solar rays.

What is claimed is:

1. A solar heating device comprising a support, a frame universally mounted on the support, a pair of reflectors mounted on the frame, each reflector comprising a plurality of segments pivotally joined at one end and interconnected by flexible means so that they can be expanded to form a semiparabolic reflector or collapsed to a superposed storage position, means on the support to enable an object to be heated to be held in the vicinity of the focal points of the reflectors when expanded, and means on the frame to enable adjustment of the focal points of the reflectors when expanded.

2. A solar heating apparatus as claimed in claim 1, in which each reflector comprises a plurality of segments pivotally connected at one end so that they can be moved in fanlike manner between an expanded position and a collapsed position, the plurality of segments comprising a set of first segments and a set of second segments, the first and second segments alternating, a first flexible tape interconnecting adjacent first segments and a second flexible tape interconnecting adjacent second segments.

3. A solar heating apparatus as claimed in claim 1, in which each reflector comprises a plurality of sector-shaped segments, each segment having converging first and second edges, a narrow first end and a widened second end, the segments being pivotally connected together adjacent to the first ends so that they can be moved in fanlike manner between an expanded position and a collapsed position, a first reflecting surface of each segment facing in a first direction and a second rear surface of each segment facing in a second direction opposite the first, each reflector comprising a set of first segments and a set of second segments, the first and second segments alternating, a first flexible tape joining the first segments, the first tape being joined to the second surface of each first segment adjacent to the first edge of the second end, and a second flexible tape joining the second segments, the second tape being joined to the second surface of each second segment adjacent to the first edge of the second end, wherein in the collapsed position the segments are superposed with the first edges in line and the second edges in line, the first tape passing around the second edges of adjacent first and second segments and the second tape passing around the second edges of adjacent second and first segments, and in the expanded position the first edges adjacent the second end of each segment slightly overlapping the second edge adjacent the second end of an adjacent segment.

4. A solar heating apparatus according to claim 1, in which the support comprises a first post and collapsible means for maintaining the first post vertically on a supporting surface, the frame comprising first and second rigid members universally jointed to the first post and extending on either side of the first post, the pair of reflectors being pivotally connected to the first rigid member adjacent to the first post, an end one of the segments of each reflector being connected at an outer end to the first rigid member, means on the first rigid member for supporting the reflectors when in the collapsed position, and means on the second rigid member for adjustably holding the other end one of the segments of each reflector in an expanded position.

5. A solar heating apparatus according to claim 4, in which the point of pivoting of each reflector is positionally adjustable laterally of the first rigid member.

6. A solar heating apparatus according to claim 4, in which the said one end segment is connected to the first rigid member by means positionally adjustable in a direction perpendicular to the surface of the segment.

7. A solar heating apparatus according to claim 4, in which the means for adjustably holding the other end one of the segments in the expanded position comprises a crosspiece on the second rigid member, a plurality of apertures in the crosspiece, and a hook on the other end one of the segments selectively hookable into the apertures.

8. A solar heating apparatus according to claim 4, in which the means for holding an object to be heated comprises a second post connected in continuation of the first post and a plate on the second post for supporting an object.

9. A solar heating apparatus according to claim 4, in which the means for holding an object to be heated comprises a second post removably connected in continuation of the first post about the universal joint means for connecting the frame to the first post, the second post being rotatable about an axis passing along the first and second posts, a gridlike plate pivotally mounted to the second post, and means for fixing the plate in a horizontal position.

10. A solar heating apparatus according to claim 4, in which the means for holding an object to be heated comprises a second post universally connected to the first post, the second post being constrained to be able to move in the planes defined by the first post and a line along the center of the first and second rigid members, a gridlike plate pivotally mounted to the second post, and means for fixing the plate in a horizontal position.

11. A solar heating apparatus according to claim 4, in which the first and second rigid members are articulated together.

12. A solar heating apparatus according to claim 4, in which the first and second rigid members are hinged together, the first rigid member forming a bottom part of a case and the second rigid member forming a top part of a case, the case being adapted to hold therein the pair of reflectors in the collapsed position, the means for holding an object to be heated, the means for adjustment of the focal points of the reflectors, and at least a part of the support.

13. A solar heating apparatus according to claim 4, in which the means for holding an object to be heated comprises a second post universally connected to the first post, the second post being constrained to be able to move in the planes defined by the first post and a line along the center of the first and second rigid members, a gridlike plate pivotally mounted to the second post, and means for fixing the plate in a horizontal position, the first and second rigid members are hinged together, the first rigid member forming a bottom part of a case and the second rigid member forming a top part of a case, the case being adapted to hold therein the pair of reflectors in the collapsed position, the second post and the plate folded flat against the pair of reflectors in the collapsed position, the means for adjustment of the focal points of the reflectors, and at least a part of the support.

* * * * *